(12) United States Patent
Valentin et al.

(10) Patent No.: US 11,467,043 B2
(45) Date of Patent: Oct. 11, 2022

(54) TEMPERATURE MONITORING APPARATUS

(71) Applicant: AIRBUS OPERATIONS LIMITED, Bristol (GB)

(72) Inventors: Damien Valentin, Bristol (GB); Alessio Cipullo, Bristol (GB)

(73) Assignee: Airbus Operations Limited, Bristol (GB)

( * ) Notice: Subject to any disclaimer, the term of this patent is extended or adjusted under 35 U.S.C. 154(b) by 913 days.

(21) Appl. No.: 16/273,796

(22) Filed: Feb. 12, 2019

(65) Prior Publication Data

US 2019/0250048 A1    Aug. 15, 2019

(30) Foreign Application Priority Data

Feb. 13, 2018 (GB) .................................. 1802341

(51) Int. Cl.
*G01K 11/32* (2021.01)
*B64D 45/00* (2006.01)
(Continued)

(52) U.S. Cl.
CPC .......... *G01K 11/32* (2013.01); *G01K 11/3206* (2013.01); *G02B 6/02076* (2013.01);
(Continued)

(58) Field of Classification Search
CPC .. G01K 11/32; G01K 11/3206; G01K 11/322; G01K 11/324; G02B 6/02076;
(Continued)

(56) References Cited

U.S. PATENT DOCUMENTS 4,298,794 A * 11/1981 Snitzer ................. G02B 6/4439
  374/161
6,945,692 B2 * 9/2005 Dammann ............. B64D 45/00
  374/161
(Continued)

FOREIGN PATENT DOCUMENTS

WO    2015/199590    12/2015

OTHER PUBLICATIONS

Cho et al., "Development and Improvement of an Intelligent Cable Monitoring System for Underground Distribution Networks Using Distributed Temperature Sensing", Energies 2014, 7, pp. 1076-1094.

*Primary Examiner* — Nathaniel T Woodward
*Assistant Examiner* — Philip L Cotey
(74) *Attorney, Agent, or Firm* — Nixon & Vanderhye P.C.

(57) ABSTRACT

A temperature monitoring apparatus configured to monitor a temperature of a portion of a vehicle's electrical energy distribution network is disclosed. The apparatus includes a first optical fibre including one or more temperature sensing sections, each temperature sensing section being for thermal contact with a portion of a vehicle's electrical energy distribution network. Each temperature sensing section is arranged to produce, in response to an optical input signal, an optical output signal indicative of the temperature of the temperature sensing section. The apparatus is arranged to determine a temperature of the portion of the vehicle's electrical energy distribution network based on one or more of the output optical signals in use.

16 Claims, 3 Drawing Sheets

(51) Int. Cl.
  *G01K 11/3206*   (2021.01)
  *G02B 6/02*   (2006.01)
  *G01K 11/322*   (2021.01)
  *G01K 11/324*   (2021.01)
  *H02J 4/00*   (2006.01)

(52) U.S. Cl.
  CPC .... *B64D 2045/009* (2013.01); *B64D 2221/00* (2013.01); *G01K 11/322* (2021.01); *G01K 11/324* (2021.01); *G02B 6/02052* (2013.01); *H02J 4/00* (2013.01)

(58) Field of Classification Search
  CPC .......... G02B 6/02052; B64D 2045/009; B64D 2221/00; H02J 4/00
  See application file for complete search history.

(56) References Cited

U.S. PATENT DOCUMENTS

| | | | | |
|---|---|---|---|---|
| 8,130,101 | B2 * | 3/2012 | Pellen | G01K 13/00 340/568.2 |
| 2002/0125414 | A1 * | 9/2002 | Dammann | B64D 45/00 250/227.14 |
| 2004/0071185 | A1 * | 4/2004 | Syracuse | G01K 11/32 374/E11.015 |
| 2005/0089081 | A1 * | 4/2005 | Dammann | B64D 45/00 374/161 |
| 2009/0103072 | A1 * | 4/2009 | Fromme | G01M 11/3172 356/3 |
| 2012/0293806 | A1 * | 11/2012 | Cranch | G01D 5/35383 374/E13.001 |
| 2013/0258529 | A1 * | 10/2013 | Carroll | G01J 5/0018 361/1 |
| 2014/0203783 | A1 * | 7/2014 | Kiesel | H01M 10/4257 320/167 |
| 2014/0266742 | A1 * | 9/2014 | Rennie | G08B 7/064 340/584 |
| 2015/0134137 | A1 * | 5/2015 | Perju | H02J 1/08 700/295 |
| 2015/0280290 | A1 * | 10/2015 | Saha | H01M 10/425 324/426 |
| 2017/0021914 | A1 * | 1/2017 | Small | B64C 13/16 |
| 2017/0334574 | A1 * | 11/2017 | Wilson | G08C 23/04 |
| 2019/0011491 | A1 * | 1/2019 | Raghavan | G01R 31/62 |
| 2019/0025095 | A1 * | 1/2019 | Steel | G01D 5/35396 |

* cited by examiner

TEMPERATURE MONITORING APPARATUS

RELATED APPLICATION

This application is claims priority to United Kingdom Patent Application GB 1802341.6 filed 13 Feb. 2018, the entire contents of which is hereby incorporated by reference.

TECHNICAL FIELD

The present invention relates to a temperature monitoring apparatus, and more particularly to an apparatus configured to monitor a temperature a portion of a vehicle's electrical energy distribution network.

BACKGROUND

Vehicles, such as aircraft, comprise electrical energy distribution networks, or electrical power distribution networks, to deliver electrical energy from electrical energy sources, such as batteries or generators, to electrical energy consumers, such as electrical equipment of the vehicle. Electrical energy distribution networks can generate a significant amount of heat.

To reduce the risk of overheating, electrical energy distribution networks may be oversized, i.e. possess a power or current rating larger, in some cases much larger, than the actual power or current distributed through the network. However, this is costly and can add unnecessary mass to the electrical energy distribution network, which may be undesirable in vehicles such as aircraft.

Typical temperature sensing systems used on vehicles such as aircraft are based on thermocouples and resistance temperature detector (RTD) devices. A thermocouple comprises two dissimilar electrical conductors that produces a temperature dependant voltage that can be measured to interpret temperature. An RTD device comprises a length of wire, for example of pure metal, that has a defined resistance to temperature relationship that can be used to provide an indication of temperature. However, applying such temperature sensing systems to electrical energy power distribution network may lead to a complex, inflexible and heavy system, which may be undesirable in vehicles such as aircraft. Further, such sensors (and/or their electrical wiring) would require a high level of protection or shielding in order to mitigate Electro Magnetic Interferences (EMI) from the electrical energy distribution network itself, or from lightning currents, which may be problematic in aircraft.

It is an object of the present invention to mitigate at least some of the drawbacks of the prior art.

SUMMARY

According to a first aspect of the present invention, there is provided a temperature monitoring apparatus configured to monitor a temperature of a portion of a vehicle's electrical energy distribution network, the apparatus comprising: a first optical fibre, the first optical fibre comprising one or more temperature sensing sections, each temperature sensing section being for thermal contact with a portion of a vehicle's electrical energy distribution network, each temperature sensing section being arranged to produce, in response to an optical input signal, an optical output signal indicative of the temperature of the temperature sensing section; wherein the apparatus is arranged to determine a temperature of the portion of the vehicle's electrical energy distribution network based on one or more of the output optical signals in use.

Optionally, one or more of the temperature sensing sections is arranged for temperature dependant optical back-scattering of the optical input signal thereby to produce the optical output signal.

Optionally, one or more of the temperature sensing sections comprises a Fibre Bragg Grating.

Optionally, the first fibre comprises an optical absorber at or near a termination point of the first fibre.

Optionally, the apparatus comprises a plurality of said first optical fibres, each first optical fibre being for thermal contact with a respective different portion of the electrical energy distribution network.

Optionally, the apparatus comprises an optical director component arranged for directing the optical input signal to, and/or the output optical signal from, each of the plurality of first optical fibres.

Optionally, the optical director component comprises a passive optical splitter arranged to direct the optical input signal to, and/or the optical output signal from, the plurality of first optical fibres.

Optionally, the optical director component comprises an active optical switch controllable to direct the optical input signal to, and/or the optical output signal from, a selectable one or more of the first optical fibres.

Optionally, the optical director component comprises a predetermined number of ports each for connection of a said first optical fibre.

Optionally, the apparatus comprises a feeder optical fibre arranged to provide the optical input signal to, and/or the optical output signal from, the optical director component.

Optionally, the apparatus comprises an optical interrogator arranged to provide the optical input signal to one or more of the temperature sensing sections of the or each first optical fibre.

Optionally, the optical interrogator is arranged to receive the optical output signal from one or more of the temperature sensing sections of the or each first optical fibre.

Optionally, the apparatus is arranged to provide the optical input signal to the or each of the first optical fibres simultaneously.

Optionally, the apparatus is arranged to provide the optical input signal to the or each of the first optical fibres sequentially.

According to a second aspect of the present invention, there is provided a system comprising: the temperature monitoring apparatus according to the first aspect; and the vehicle's electrical energy distribution network.

Optionally, the electrical energy distribution network comprises a management unit arranged to control the flow of electrical energy within the electrical energy distribution network based on the determined temperature.

Optionally, the electrical energy distribution network comprises one or more nodes and one or more links each connected to one or more of the nodes, wherein the or each first optical fibre is in thermal contact with a respective one of the links, and wherein the apparatus is arranged to determine the temperature of one or more of the links.

Optionally, the or each first optical fibre is embedded in a respective one of the links.

Optionally, one or more of the nodes are active nodes, and the management unit is arranged to control the one or more active nodes in order to control each of the electrical connections of the links connected to the or each active node.

Optionally, the electrical energy distribution network comprises a plurality of the nodes and a plurality of internode links, the internode links connecting together the nodes to form at least one mesh of a meshed network, the or each mesh being polygonal of an order higher than or equal to three, at least one of the nodes of each mesh being an active node.

Optionally, the management unit is arranged to control the one or more active nodes using optical control signals transmitted via one or more optical fibres of the temperature monitoring apparatus.

According to a third aspect of the present invention, there is provided a vehicle comprising the apparatus according to the first aspect or the system according to the second aspect.

Optionally, the vehicle is an aircraft.

According to a fourth aspect of the present invention, there is provided a method of monitoring the temperature of a vehicle's electrical energy distribution network, the method comprising: sending an optical input signal into a first optical fibre, the first optical fibre comprising one or more temperature sensing sections, each temperature sensing section being in thermal contact with a portion of the vehicle's electrical energy distribution network, each temperature sensing section being arranged to produce, in response to the optical input signal, an optical output signal indicative of the temperature of the temperature sensing section; and determining a temperature of the vehicle's electrical energy distribution network based on one or more of the optical signals.

According to a fifth aspect of the present invention, there is provided a vehicle electrical energy distribution network temperature monitoring apparatus, the apparatus comprising: a first optical fibre, the first optical fibre comprising one or more temperature sensing sections, each temperature sensing section being for thermal contact with a portion of a vehicle electrical energy distribution network, each temperature sensing section being arranged such that a change in the temperature of the temperature sensing portion causes a change in an optical output signal produced by the temperature sensing section in response to an optical input signal; wherein the apparatus is arranged to determine a temperature characteristic of the vehicle electrical energy distribution network based on one or more of said optical output signals.

DETAILED DESCRIPTION

Figure 1:
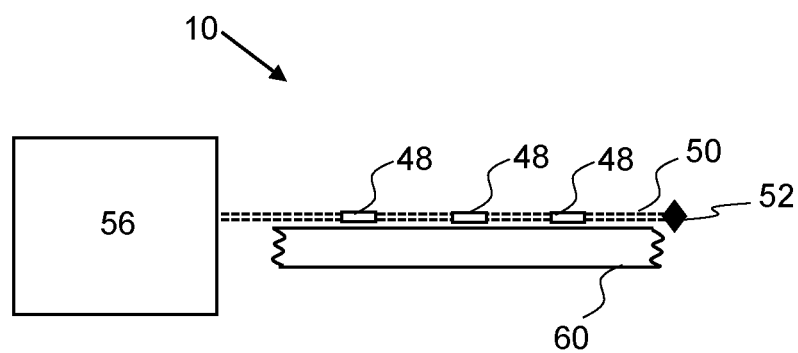
FIG. 1 illustrates schematically a vehicle electrical energy distribution network temperature monitoring apparatus, according to an example.

Referring to FIG. 1, there is illustrated a temperature monitoring apparatus 10. The temperature monitoring apparatus 10 is an electrical energy distribution network temperature monitoring apparatus 10. Specifically, the apparatus 10 is a vehicle electrical energy distribution network temperature monitoring apparatus 10. The temperature monitoring apparatus 10 is configured to monitor a temperature of a portion of a vehicle's electrical energy distribution network. For example, the vehicle may be a transport vehicle. For example, the vehicle may be an aircraft.

The apparatus 10 comprises a first optical fibre 50. The first optical fibre 50 comprises one or more temperature sensing sections 48 (three are illustrated in FIG. 1). Each temperature sensing section 48 is in thermal contact with a portion 60 of the vehicle's electrical energy distribution network (not shown in FIG. 1). Each temperature sensing section 48 is arranged to produce, in response to an optical input signal, an optical output signal indicative of the temperature of the temperature sensing section 48. The apparatus 10 is arranged to determine a temperature of the portion 60 of the transport vehicle electrical energy distribution network (not shown in FIG. 1) based on one or more of the optical output signals.

The temperature monitoring apparatus 10 being based on optical fibres as described above allows for monitoring of the temperature of the vehicle's electrical energy distribution network by an apparatus that is relatively lightweight and has a relatively low susceptibility to Electro Magnetic Interferences (EMI) from the electrical energy distribution network itself, or from lightning currents, for example. Further, the optical fibre-based apparatus 10 may be relatively flexible in its deployment, and may be relatively easily scalable to cover large, or a large number of, portions, for example power cables, of the vehicle's electrical energy distribution network. Monitoring the temperature of a portion 60 of the vehicle's electrical energy distribution network may allow for overheating of the portion 60 of the network to be determined and hence controlled and/or avoided. Accordingly, components of the vehicle's electrical energy distribution network may have reduced power or current ratings, as there is a reduced chance of overheating occurring, and hence the components of the electrical energy distribution network may be made smaller and/or lighter, which may be desirable for vehicles such as aircraft.

The apparatus 10 comprises an optical interrogator 56. The optical interrogator 56 is in optical communication with the first optical fibre 50. For example, the first fibre 50 may be connected to the optical interrogator 56 via a suitable port (not shown). The optical interrogator 56 is arranged to provide the optical input signal to one or more of the temperature sensing sections 48 of the first optical fibre 50. The optical interrogator 56 is arranged to receive the optical output signal from one or more of the temperature sensing sections 48 of the or each first optical fibre 50. The optical interrogator 56 comprises a light source (not shown) for generating the optical input signal, and an optical detector (not shown) for detecting the output optical signal. In some examples, the optical interrogator 56 is arranged to determine a temperature or temperature characteristic of the portion 60 of the vehicle's electrical energy distribution network (not shown in FIG. 1) based on the detected optical output signals. For example, the optical interrogator 56 may comprise a processor and a memory (not shown) arranged to process the detected output optical signals and determine on the basis of these, by suitable calibration, one or more temperatures associated with one or more of the temperature sensing sections 48 respectively. In other examples, this determination may be performed by another or other components (not shown) of the apparatus 10.

A change in the temperature of a temperature sensing portion 48 may cause a change in a scattering characteristic of the temperature sensing section 48, which may cause a change in the optical output signal produced by the temperature sensing section 48 in response to an optical input signal. That is, the optical input signal may experience temperature dependant scattering at a temperature sensing section 48, which scattered light may form the optical output signal.

In some examples, one or more of the temperature sensing sections 48 is arranged for temperature dependant optical back-scattering of the optical input signal thereby to produce the optical output signal. That is, the optical input signal may travel in a first direction along the first optical fibre 50, and the optical input signal may experience temperature dependant scattering at a temperature sensing section 48, and the scattered light forming the optical output signal may travel in a second direction along the first optical fibre 50, opposite to the first direction. This may allow a reduction in the length of the first optical fibre 50 needed to determine the temperature of the portion 60 of the electrical energy distribution network (not shown).

In some examples, as illustrated in FIG. 1, the first optical fibre 50 may comprise a plurality of the temperature sensing sections 48. In some examples, the temperature sensing sections 48 may be equally spaced along a first optical fibre 50. Having a plurality of temperature sensing sections 48, for example along the length of a single optical fibre, may allow for temperature monitoring along a length of the power cable or electrical link 60 of the electrical energy distribution network, and which is sensitive to local variations in temperature along the length of the electrical link 60. This may provide for a more accurate and/or more comprehensive temperature determination, and hence for improved detection and/or avoidance of overheating of distribution network, for example.

In some examples, one or more of the temperature sensing sections 48 comprises a Fibre Bragg Grating (FBG). A FBG is a distributed Bragg reflector located within the optical fibre 50 and comprising periodic variations in the refractive index of the core of the fibre 50 along a section of the length of the optical fibre 50. The wavelength of a band of light reflected from the FBG is dependent on temperature of the section 48. When an FBG is in thermal contact with (for example bonded to, attached to, tightly wound around, or embedded in) a portion (for example a cable or other electrical link 60) of the electrical energy distribution network, a change in temperature of the portion 60 changes a temperature of the FBG, which in turn changes the wavelength of a band of light reflectable by the FBG. Therefore, by monitoring light reflected (forming the output optical signal) from an FBG in thermal contact with the portion 60, the temperature of the portion 60 may be determined.

A plurality of the temperature sensing sections 48 of a single first optical fibre 50 may each comprise an FBG. For example, the range of wavelengths reflectable by one FBG located in a fibre may be different from the range of wavelength reflectable by a second FBG in the same fibre. A first FBG may therefore be transparent to a range of wavelengths needed to interrogate a second FBG, and the first and second FBGs may be transparent to a range of wavelengths needed to interrogate a third FBG, and so on. As a result, multiple temperature sensing sections 48 may be located in a single optical fibre 50, which may reduce the weight and complexity of connections needed to interrogate the temperature sensing sections 48. The identity and hence location of a particular one of the FBGs interrogated may be determined based on the range of input optical signal wavelengths used for interrogation and/or the range of wavelengths of the output optical signal received.

In some examples, one or more of the temperature sensing sections 48 are arranged for Brillouin scattering and/or Raman scattering or the like. In these examples, the first optical fibre 50 may be an optical fibre, for example a telecommunications optical fibre 50. In these examples, the first optical fibre 50 itself, or a portion thereof, may constitute a temperature sensing section 48. In Brillouin scattering examples, the optical input interacts with material deformation waves, for example phonons, in the optical fibre 50, the properties of which phonons may vary with temperature. A light wave of the optical input signal interacts with a deformation wave of the optical fibre 50 to produce a scattered light wave, which may have a different frequency to the optical input signal. The scattered light wave may then be used as the temperature dependant optical output signal. For example, the frequency shifts as a result of Brillouin scattering as compared to the frequency of the input optical signal may be detected with an interferometer. In Raman scattering, the optical input signal is scattered by excitation of vibrational and rotational transitions of molecules of the optical fibre 50, the properties of which scattered light may vary with temperature of the optical fibre 50. The scattered light may then be used as the temperature dependant optical output signal. For example, the optical output signal produced as a result of Raman scattering as compared to the input optical signal may be detected with an interferometer or a grating spectrometer, for example.

For both the Brillouin and Raman scattering examples (and other scattering examples), the temperature of a particular location along the optical fibre 50 may be determined based on time-of-flight techniques. For example, the interrogator 56 may measure the time between sending of the optical input signal and receipt of the optical output signal and use this time in conjunction with the speed of light in the optical fibre 50 to determine the distance along the optical fibre 50 at which the optical output signal was produced.

In some examples, the first optical fibre 50 may comprise an optical absorber 52 at or near an end or termination point of the first optical fibre 50. For example, the optical absorber 52 may be at a termination point of the first optical fibre 50 that is distal to the optical interrogator 56. The optical absorber 52 may avoid or reduce back-reflections of the optical input signal, and hence may improve the sensitivity of the detection of the optical output signal produced by the temperature sensing portions 48.

Figure 2:
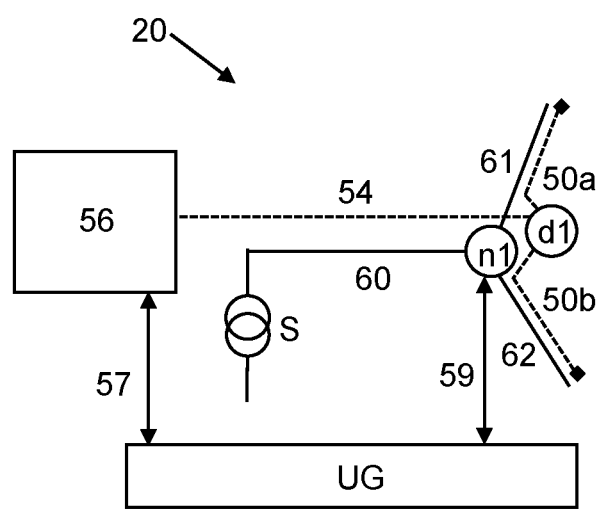
FIG. 2 illustrates schematically a vehicle electrical energy distribution network temperature monitoring apparatus, according to an example.

Referring now to FIG. 2, in some examples, the apparatus (given reference sign 20 in FIG. 2) may comprise a plurality of the first optical fibres 50a, 50b (two are shown in FIG. 2), each first optical fibre 50a, 50b being in thermal contact with a respective different portion 61, 62 of the vehicle's electrical energy distribution network. Each of the first optical fibres 50a, 50b may be the same or similar to those described above with reference to FIG. 1.

The electrical energy distribution network may comprise one or more nodes n1 and one or more links 60, 61, 62 each connected to one or more of the nodes n1. In some examples, there may be a plurality of nodes n1 and one or more of the links 61, 62 may be internode links that connect together nodes n1. Each first optical fibre 50a, 50b is in thermal contact with a respective one of the links 61, 62. The apparatus 20 is arranged to determine the temperature of one or more of the links 61, 62. In this example, the electrical energy distribution network comprises an electrical source S connected to an electrical junction or node n1 by a first electrical cable or link 60, also referred to herein as an external link 60. The first portion 61 of the distribution network is a first link 62 extending from the electrical node n1, and the second portion 62 of the distribution network is a second, separate link 62 extending from the electrical node n1. The node n1 distributes electrical energy from the source S to the first link 61 and the second link 62, from where electrical energy may be provided to one or more electrical consumers (not shown in FIG. 2). One of the first optical fibres 50a is in thermal contact with the first link 61, and another of the first optical fibres 50b is in thermal contact with the second link 62. Having a plurality of first optical fibres may allow for the temperature of a wider range of the vehicle's electrical energy distribution network to be monitored.

In the example of FIG. 2, the apparatus 20 comprises an optical director component d1 arranged for directing the optical input signal to, and/or the optical output signal from, each of the plurality of first optical fibres 50a, 50b. In this example, a feeder optical fibre 54 is arranged to provide the optical input signal to, and/or the optical output signal from, the optical director component n1 (and hence the optical input signal to, and/or the optical output signal from, the one or more of the first fibres 50a, 50b). The feeder optical fibre 54 optically connects the optical interrogator 56 (which may be the same or similar to that described above with reference to FIG. 1) with the director component d1. The optical director component d1 may be located at or near the node n1. In some examples, the optical director component d1 may be integral with the node n1. This may help to save space and weight. The optical director component d1 may allow for the temperature of multiple portions of the electrical energy distribution network to be monitored with a relatively small length of fibre optic cable. This may save weight and expense of the temperature monitoring apparatus 20.

In some examples, the apparatus 20 may be arranged to provide the optical input signal to the or each of the first optical fibre 50a, 50b simultaneously. For example, in some examples, the optical director component d1 comprises a passive optical splitter arranged to direct the optical input signal to, and/or the optical output signal from, the plurality of first optical fibres 50a, 50b. For example, the optical splitter may take the optical input signal from the feeder optical fibre 54 and split it equally between each of the first optical fibres 50a, 50b. In this way, both of the first optical fibres 50a, 50b may be interrogated substantially simultaneously. This may allow the apparatus 20, for example the optical interrogator 56, to determine the temperature of both the first link 61 and the second link 62 of the vehicle's energy distribution network substantially simultaneously. This may allow a relatively fast temperature determination over different portions of the distribution network, and hence may allow for faster, for example real time or near real time, response to overheating of the distribution network, for example. The passive optical splitter may provide for relatively inexpensive and simple means by which to distribute the optical interrogation over multiple first fibres 50a, 50b.

In some examples, the light source (not shown) of the optical interrogator 56 may comprise a broadband light source, and the optical input signal may be a broad band spectrum of light. The optical detector (not shown) of the optical interrogator 56 may comprise a wavelength meter arranged to measure wavelength of the optical output signals. The interrogator 56 may be arranged to determine from which first optical fibre 50a, 50b an optical output signal originates based on the wavelength or wavelength range of the optical output signal. For example, a temperature sensing section 48 of a first one 50a of the first optical fibres 50a, 50b may arranged to produce optical output signals in a different wavelength band to a temperature sensing section 48 of a second one 50b of the first optical fibres 50a, 50b. As another example, the light source of the optical interrogator 56 may comprise a tunable narrow band optical source, for example a tunable laser, which may be controllable to emit light successively at different wavelengths. The interrogator 56 may be arranged to determine from which first optical fibre 50a, 50b an optical output signal originates based on the time window in which the optical output signal is received. For example, a temperature sensing section 48 of a first one 50a of the first optical fibres 50a, 50b may be arranged to produce an optical output signal in response to input light of a different wavelength band to a temperature sensing section 48 of a second one 50b of the first optical fibres 50a, 50b. As another example, the optical interrogator 56 may be arranged to measure the time between sending of the optical input signal and receipt of the optical output signal and use this time in conjunction with the speed of light to determine by which first optical fibre 50a, 50b the optical output signal was produced. For example, a temperature sensing section 48 of a first one 50a of the first optical fibres 50a, 50b may be located at an (optical path) distance different that of a temperature sensing section 48 of a second one 50b of the first optical fibres 50a, 50b. In some examples, other suitable division multiplexing, for example phase division multiplexing, may be used.

In some examples, the apparatus 20 may be arranged to provide the optical input signal to the or each of the first optical fibres 50a, 50b sequentially. For example, in some examples, the optical director component d1 may comprise an active optical switch controllable to direct the optical input signal to, and/or the optical output signal from, a selectable one or more of the first optical fibres 50a, 50b. For example, the optical switch may be controllable by the optical interrogator 56 to direct light between the optical interrogator 56 and a first 50a of the first optical fibres 50a, 50b, (but to substantially block light between the optical interrogator 56 and a second 50b of the first optical fibres 50a, 50b), or to direct light between the optical interrogator 56 and the second 50b of the first optical fibres 50a, 50b, (but to substantially block light between the optical interrogator 56 and the first 50a of the first optical fibres 50a, 50b). For example, the active optical switch may be controlled by the optical interrogator 56 using optical communication via the feeder optical fibre 54. For example, the active optical switch may be arranged to process optical control signals received from the optical interrogator 56 via the feeder optical fibre 54, and to select, on the basis thereof, which of the first optical fibres 50a, 50b to direct the optical input signals and optical output signals to and/or from. The optical interrogator 56 may determine from which of the first optical fibres 50a, 50b an optical signal originates based on a determination of which of the first optical fibres 50a, 50b the optical director component d1 has been controlled to direct the optical input signals and optical output signals to and/or from. In some examples, the active optical switch may be controlled by another controller or device (not shown) by other forms of control (not shown). In this case, the other controller or device (not shown) may inform the optical interrogator 56 which of the first optical fibres 50a, 50b the optical director component d1 has been controlled to direct the optical input signals and optical output signals to and/or from. The active optical switch may provide for relatively inexpensive and simple first fibres to be used, and/or for relatively simple processing of the optical signals at the optical interrogator 56. The active optical switch may also provide for flexibility and scalability of the temperature monitoring system 20.

In some examples, the optical director component d1, or each of the optical director components d1 (described in more detail below), may comprise (e.g. have) a predetermined number of ports each for connection of a first optical fibre 50a, 50b. For example, each optical director component d1 may have two or three or four or five or six or seven or eight or nine or ten ports for connection of a first optical fibre 50a, 50b. For example, the director components d1 may each be substantially the same as one another. Each optical director component may also comprise one port for a feeder optical fibre 54. Having multiple ports (e.g. more ports than would be necessary for a give deployment) allows for the temperature monitoring system to be adapted and/or scaled without having to replace the optical director component d1. Each optical director component d1 having (the same) predetermined number of ports and/or being the same as one another allows the adaptability and/or scalability without increasing the part number count. This may be important for aircraft and may increase the efficiency of and/or reduce the cost of manufacture and/or maintenance of the aircraft, for example.

In some examples, the first fibre 50a, 50b may be embedded in its associated power cable or link 61, 62. For example, each first fibre 50a, 50b may be embedded in a respective one of the links 61, 62. This may allow the temperature monitoring system to take up a reduced space and may provide for protection of the first optical fibre 50 by the rest of the power cable, from damage. This may also allow for improved mechanical isolation of the first optical fibres 50 which may allow for improved accuracy of the temperature measurements.

As illustrated in FIG. 2, the vehicle's electrical energy distribution network may comprise a management unit UG arranged to control the flow of electrical energy within the vehicle's electrical energy distribution network. The management unit UG may be arranged to control the flow of electrical energy within the electrical energy distribution network based on the determined temperature. For example, the management unit UG may be in communication with the optical interrogator 56, for example over a suitable data link 57. The optical interrogator 56 may provide information to the management unit UG. For example, the optical interrogator 56 may provide the temperature or a temperature characteristic of one or more or all of the links 61, 62 of the distribution network. The management unit UG may be arranged to process the temperature information to determine, for example, whether any one of the links 61, 62 is or may be overheating. The management unit UG may then control the flow of vehicle's electrical energy within the electrical energy distribution network so as to reduce or prevent overheating.

In some examples, one or more of the nodes n1 of the distribution network are active nodes. For example, an active node may be controllable to control the flow of electrical energy to one or more of the links 60, 61, 62 that are connected to the active node. For example, the active node may be controllable to reduce or stop the flow of electrical energy to one or more of the links 61, 62. In some examples, the management unit UG is arranged to control one or more active nodes n1 in order to control the each of the electrical connections of the links connected to the or each active node n1. For example, if the management unit UG determines that one of the links 61, 62 connected to active node n1 is or may be overheating, then the management unit UG may control the active node n1 to reduce or prevent the flow of electrical energy to that link 61, 62 thereby reducing or preventing overheating of that link 61, 62. The control signals may be sent by the management unit UG to one or more of the active nodes by any suitable data link 59. In one example, the data link 59 may be in the form of an optical fibre 59, which may be separate to the feeder optical fibre 54.

In some examples, the management unit UG is arranged to control the one or more active nodes using optical control signals transmitted via one or more optical fibres 54 of the temperature monitoring apparatus 20. For example, the management unit UG may pass a control signal to the optical interrogator 56 via the data link 57. The optical interrogator 56 may inject the control signal as an optical control signal into the feeder optical fibre 54. The active node n1 may be arranged to receive and process the optical control signal. For example, an optical splitter (not shown) may be used to divert a portion of light input into the feeder optical fibre 54 to a processor (not shown) of the active node n1. For example, the active node n1 and the optical director component d1 may be substantially integral with one another and/or provided in a common housing (not shown). The processor (not shown) of the active node n1 may then process the optical control signal and convert it into an electrical control signal so as to control the active node n1 according to the optical control signal. In some examples, the optical control signal may be provided in a different band of wavelengths to the optical input signal used for temperature monitoring. This may reduce the risk of an input optical signal being misinterpreted by the active node n1 as an optical control signal. Providing the control signals for the active node n1 and the optical input signal for the temperature monitoring in a common optical fibre 54 may allow for a cost, weight and/or complexity reduction as compared to providing different channels for each.

In some examples, if one of the power cables or links 61, 62 gets damaged or cut together with the first optical fibre 50, the optical interrogator 56 may determine that this has occurred, and this may be provided to the management unit UG as an indication for the health status of the power cable. For example, if, despite sending an optical input signal expected to lead to an optical output signal being received, the optical interrogator 56 does not receive the expected optical output signal, the optical interrogator 56 may determine that there may be a fault with the power cable of link, for example that a BITE (Built-In Test Equipment) event has occurred. The management unit UG may then control the flow of electrical energy in the distribution network accordingly, for example so as to avoid the possible damage location, and/or may raise an alarm as appropriate.

Figure 3:
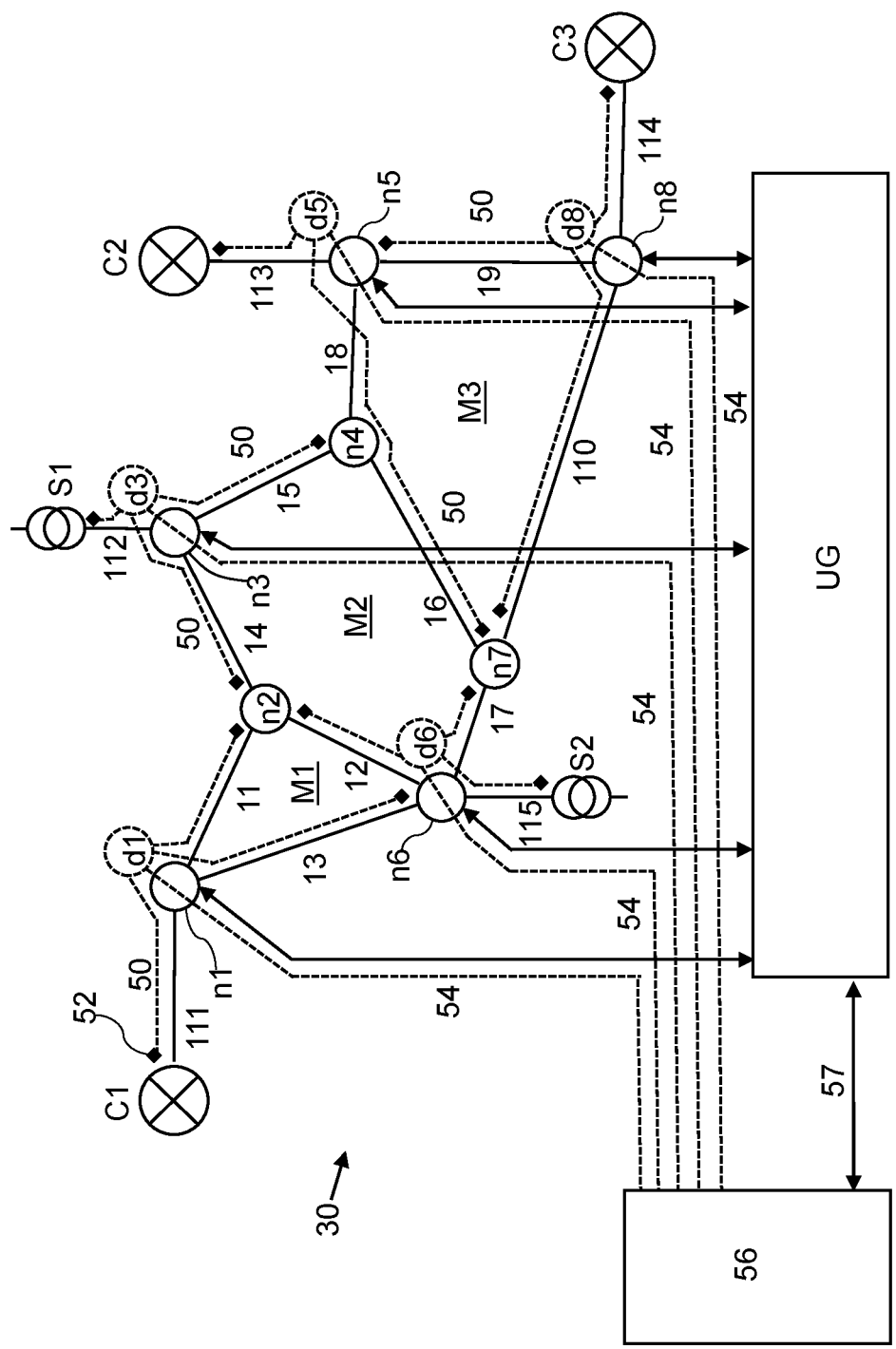
FIG. 3 illustrates schematically a vehicle electrical energy distribution network temperature monitoring apparatus, according to an example.

In some examples, as is now described with reference to FIG. 3, the electrical energy distribution network comprises a plurality of the nodes n1-n8 and a plurality of internode links 11-19, 110, the internode links 11-19, 110 connecting together the nodes n1-n8 to form at least one mesh M1-M3 of a meshed network, the or each mesh M1-M3 being polygonal of an order higher than or equal to three.

For example, the electrical energy distribution network may be the same or similar to that described in US2015134137, the entire contents of which is incorporated by reference.

Referring again to FIG. 3, power supply sources S1, S2 and equipment C1-C3 to be supplied by said power supply sources S1, S2 are connected to the mesh network by means of external links 111, 112, 113, 114, 115, and more specifically are connected to nodes n1, n3, n5, n6, and n8 of the mesh network by means of the external links 111, 112, 113, 114, 115. The nodes n1-n8 are connected together by internode links 11-19, 110 forming at least one mesh (in this example three meshes M1-M3) of a meshed network. Each mesh M1-M3 is polygonal of an order higher than or equal to three. At least one node n1, n3, n5, n6, n8 of each mesh M1-M3 is an active node designed to be controlled by the management unit UG in order to control each of the electrical connections of the internode 11-19, 110 and external 111, 112, 113, 114, 115 links connected to the active node n1, n6, n3, n5, n8. The remaining nodes n2, n4, n7 may be passive nodes, i.e. be passive since they provide the electrical connection of all the links to which they are connected.

Because in a polygonal mesh of order higher than or equal to three, to go from one node to another, three paths are possible, the electrical energy distribution network can be configured by controlling at least one active node by means of the management unit UG. This configuration can be effected during malfunctioning, for example.

In this example, the vehicle's electrical energy distribution network temperature monitoring apparatus (given reference numeral 30 in FIG. 3) comprises a plurality of optical director components d1, d3, d5, d6, d8, each associated with a respective one of the active nodes n1, n3, n5, n6, n8. Each director component may be the same or similar as that described above with reference to FIG. 2. Each optical director component d1, d3, d5, d6, d8 is in optical communication with the optical interrogator 56 via a respective feeder optical fibre 54. The optical interrogator 56 may be the same or similar to that described above with reference to FIGS. 1 and 2. Each director component d1, d3, d5, d6, d8 is connected to a plurality of first optical fibres 50. One or more or each of the plurality of first optical fibres 50 may be the same or similar to that described above with reference to FIGS. 1 and 2. Each of the plurality of first optical fibres 50 connected to a given director component d1, d3, d5, d6, d8 is in thermal contact with a respective one of the plurality of links connected to the active node n1, n3, n5, n6, n8 associated with the given director component d1, d3, d5, d6, d8. According to this scheme, each link of the network (external links and internode links) may have an associated first optical fibre to monitor the temperature thereof. Hence the temperature along all or substantially all of the links of the network may be monitored. The apparatus 30 may therefore determine whether any of the links of the network are overheating. Further, as mentioned above, in some examples the temperature can be determined at multiple locations along a first optical fibre 50. Hence the apparatus 30 may determine whether any portion of any of the links of the network are overheating. This may allow for a more comprehensive monitoring of the temperature of the power network, for example as compared to monitoring temperatures at the nodes alone.

Similarly to as described above with reference to FIG. 2, the optical interrogator 56 may interrogate each of the first optical fibres 50 simultaneously or sequentially. For example, the optical interrogator 56 may introduce an optical input signal into each of the feeder optical fibres 54, and similarly to as described above with reference to FIGS. 1 and 2, may identify the first optical fibre 50 or temperature sensing sections 48 of the first optical fibre 50 from which a given optical output signal is received based on wavelength or time or phase division multiplexing as described above, for example in combination with the identity of the feeder optical fibre 54 via which the given optical output signal is received.

The optical interrogator 56 may determine the temperature of, or the temperature of a portion of, each link of the network. The optical interrogator 56 may provide this temperature information to the management unit UG by a suitable data link 57. This information may be provided, for example, at a rate of 10 Hz, for example. Based on this information, the management unit UG may determine that one or more of the links is or may be overheating or may be malfunctioning in another way. The management unit UG may then control one or more of the active nodes n1, n3, n5, n6, n8 (control for example as described above with reference to FIG. 2) so as to reconfigure the network so as to reduce or prevent electrical energy flowing in the link determined to be overheating or otherwise malfunctioning. This may prevent or avoid or reduce the overheating in the link. Because each mesh M1-M3 is a polygonal mesh of order higher than or equal to three, regardless of which of links is malfunctioning, electrical energy may nonetheless be routed from one node to another node of the network.

As a specific example, in an initial configuration, the source S2 provides electrical energy to the consumer C1 via external link 115, active node n6, internode link 13, active node n1, and external link 111. At some point, the temperature of a portion of the internode link 13 between active node n6 and the active node n1 may increase, for example due to an increase in current flowing through internode link 13, for example due to a fault. This may accordingly increase the temperature of a temperature sensing section 48 of the first optical fibre 50 in thermal contact with the internode link 13. This increase in temperature may be determined by the interrogator 56 based on a change in the optical output signal produced by the temperature sensing section 48 of the first optical fibre 50 in response to an optical input signal. The interrogator 56 may pass this information to the management unit UG. The management unit UG may determine that the temperature of the internode link 13 is to be reduced, for example because it is or may be overheating. The management unit UG may then control the active node n6 and/or active node n1 to reduce or prevent the flow of electrical energy through internode link 13. The management unit UG may also control the active node n6 and/or active node n1 to increase or allow the flow of electrical energy through internode links 12 and 11 via passive internode link n2. The active node n1 may therefore continue to provide electrical energy to the consumer C1, whilst the temperature of the internode link 13 may be allowed to reduce.

As another example, one of the sources S1 (or S2) may, due to a failure or fault, inject an abnormal level of electrical power into the electrical energy distribution network, which may cause the temperature of the external link 112 connected the source S1 (or in the case of fault of the source S2, the temperature of the external link 115 connected to source S2) to change, for example increase, which may accordingly change the temperature of a temperature sensing section 48 of the first optical fibre 50 in thermal contact with the external link 112 (or in the case of a fault of the source S2, the temperature of a temperature sensing section 48 of the first optical fibre 50 in thermal contact with the external link 115), which may in turn be detected by the interrogator 56 as described above. The interrogator 56 may pass this information to the management unit UG. The management unit UG may determine that the temperature of the external link 112 (or external link 115) is to be reduced, for example because it is or may be overheating. The management unit UG may then control the source S1 (or S2) to shut down, or for example may launch a warning or alert for a system (not shown) controlling the operation of the source S1 (or S2) to cause the source S1 (or S2) to shut down. In some examples (not shown), one or more of the sources S1, S2 and/or one or more of the consumers C1, C2, C3 may alternatively or additionally each have an integrated protection mechanism (not shown) to detect whether there is a fault in the source S1, S2 or consumer C1, C2, C3 itself and/or whether there is a fault in the electrical energy supplied by and/or supplied to the source S1, S2 or the consumer C1, C2, C3. In these examples, the or each integrated protection mechanism may pass fault or other information to the management unit UG, and the management unit UG may control the electrical energy distribution network and/or systems (not shown) controlling the operation of the sources S1, S2 or consumers C1, C2, C3, based at least in part on this information.

The system of the temperature monitoring apparatus 30 and the vehicle's electrical energy distribution network may prevent or control overheating of a portion of the network, for example whilst allowing the network to continue to deliver electrical energy. Accordingly, components of the electrical energy distribution network may have reduced power or current ratings, as there is a reduced chance of overheating occurring, and hence the components of the electrical energy distribution network may be made smaller and/or lighter, which may be desirable for vehicles such as aircraft.

In some examples, the temperature monitoring apparatus 30 is arranged to monitor the temperature of substantially an entire length of one or more electrical flow paths in the distribution network. This may allow the management unit UG to determine the most efficient or safest electrical flow path through the distribution network. For example, if the temperature of one or more links, or an average temperature of all the links, of a first flow path from a given source S1, S2 to a given consumer C1, C2, C3 is higher than the temperature of one or more links, or an average temperature of all the links, of a second flow path from the given source S1, S2 to the given consumer C1, C2, C3, then the management unit UG may determine that it would be safer and/or more efficient (e.g. due to lower resistance) to configure the distribution network according to the second flow path, and hence may control the one or more active nodes n1, n3, n5, n6, n8 of the network to implement the second flow path accordingly. This may therefore allow for safer and/or more efficient electrical energy distribution. The temperature information provided by the apparatus 30 may therefore allow the management unit UG to effect dynamic and intelligent distribution network control.

The temperature sensing components of the apparatus 30 being optical (and in examples where the optical director competent d1 is a splitter, then the optical director component being optical) allows for a greatly reduced or eliminated susceptibility to EMI, and a greatly reduced need to provide lightning protection, as compared to the use of electrical temperature sensors. The temperature sensing sections 48 and the optical interrogator may be galvanically isolated for example by use of dielectric optical fibres. Further, the temperature monitoring being based on optical fibres may greatly reduce the weight compared to the use of electrical temperature sensors. This may be particularly important for transport vehicles, such as aircraft.

Figure 4:
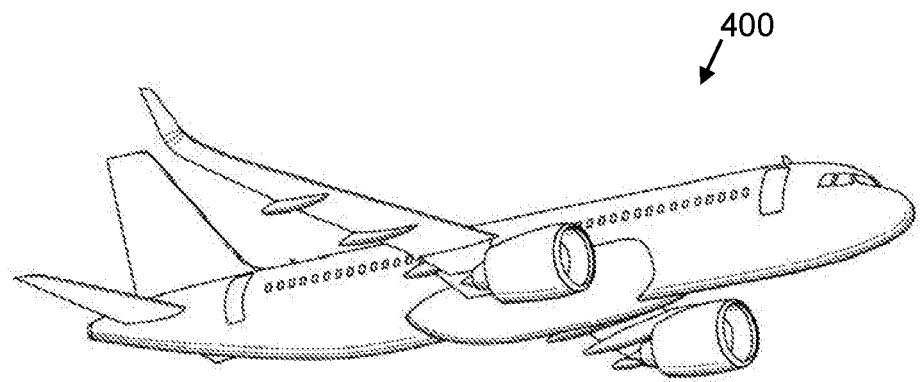
FIG. 4 illustrates schematically a vehicle in which the electrical energy distribution network temperature monitoring apparatus may be used, according to an example.

Referring to FIG. 4, there is illustrated schematically a vehicle 400, in this example an aircraft 400, in which the electrical energy distribution network temperature monitoring apparatus described above with reference to any one of FIGS. 1 to 3 may be used, and/or a system comprising the electrical energy distribution network temperature monitoring apparatus and the electrical energy distribution network, described above with reference to any one of FIGS. 1 to 3, may be used. In this example, the vehicle 400 is a transport vehicle 400.

Figure 5:
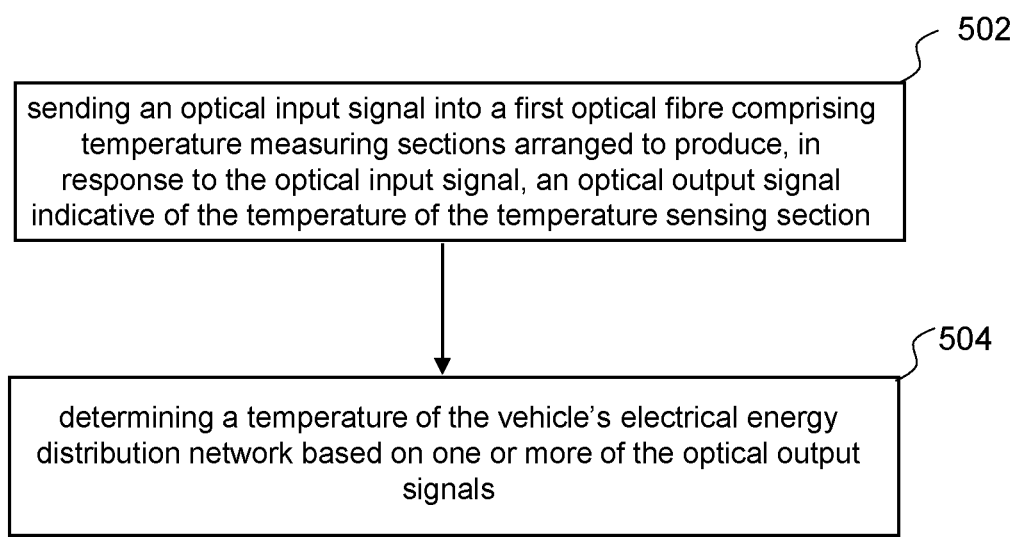
FIG. 5 illustrates schematically a method according to an example.

FIG. 5 illustrates schematically a method of monitoring the temperature of a vehicle's electrical energy distribution network (for example the network described above with reference to any one of FIGS. 1 to 3).

In step 502, the method comprises sending an optical input signal into a first optical fibre, the first optical fibre comprising one or more temperature sensing sections, each temperature sensing section being in thermal contact with a portion of the vehicle's electrical energy distribution network, each temperature sensing section being arranged to produce, in response to the optical input signal, an optical output signal indicative of the temperature of the temperature sensing section. The first optical fibre may be that described above with reference to any one of FIGS. 1 to 3.

In step 504, the method comprises determining a temperature of the vehicle's electrical energy distribution network based on one or more of the optical output signals. This may be achieved by any one or combination of the techniques, and/or may be implemented by any one or combination of the features of the apparatus, described above with reference to FIGS. 1 to 3. In some examples, the method may comprise controlling the vehicle's electrical energy distribution network based on the determined temperature, for example as described above with reference to any one of FIGS. 1 to 3.

It is noted that the term "or" as used herein is to be interpreted to mean "and/or", unless expressly stated otherwise.

The above examples are to be understood as illustrative examples of the invention. For example, it is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A temperature monitoring apparatus configured to monitor a temperature of a portion of a vehicle's electrical energy distribution network, the apparatus comprising:
 a plurality of first optical fibers each comprising one or more temperature sensing sections, each of the first optical fibers are configured for thermal contact with a respective portion of the vehicle's electrical energy distribution network, and each of the one or more temperature sensing sections are configured to produce, in response to an optical input signal, an optical output signal indicative of a temperature of the temperature sensing section, and the respective portions differ in location on the vehicle's electrical energy distribution network from other respective portions;
 an optical interrogator configured to:
  provide the optical input signal to the one or more of the temperature sensing sections of each of the first optical fibers; and
  receive the optical output signal from the one or more temperature sensing sections of each of the first optical fibers;
 an optical director component external to the optical interrogator and configured to direct the optical input signal to each of the first optical fibers and the optical output signal from to each of the first optical fibers;

a feeder optical fiber configured to provide the optical input signal from the optical interrogator to the optical director component and provide the optical output signal from the optical director component to the optical interrogator, and a component configured to determine a temperature of the respective portion corresponding to each of the first optical fibers of the vehicle's electrical energy distribution network based on one or more of the output optical signals.

2. The apparatus according to claim 1, wherein the one or more of the temperature sensing sections is:

configured for temperature dependent optical back-scattering of the optical input signal thereby to produce the optical output signal, or comprises a Fiber Bragg Grating.

3. The apparatus according to claim 1, wherein each of the first fibers comprises an optical absorber at or near a termination point of the respective one of the first fibers.

4. The apparatus according to claim 1, wherein the optical director component comprises:

a passive optical splitter arranged to direct the optical input signal to, and/or the optical output signal from, the plurality of first optical fibers, or an active optical switch controllable to direct the optical input signal to, and/or the optical output signal from, a selectable one or more of the first optical fibers, or a predetermined number of ports each for connection to one of the first optical fibers.

5. The apparatus according to claim 1, wherein the optical interrogator is arranged to receive the optical output signal from a plurality of the one or more of the temperature sensing sections of each of the first optical fibers.

6. The apparatus according to claim 1, wherein the apparatus is arranged to provide the optical input signal to each of the first optical fibers simultaneously or sequentially.

7. A system comprising:

the temperature monitoring apparatus according to claim 1, and the vehicle's electrical energy distribution network.

8. The system according to claim 7, wherein the electrical energy distribution network comprises a management unit arranged to control flow of electrical energy within the electrical energy distribution network based on the determined temperatures.

9. The system according to claim 8, wherein the first optical fiber is embedded in a respective different one of the links.

10. The system according to claim 7, wherein the electrical energy distribution network comprises one or more nodes and one or more links each connected to one or more of the nodes, wherein the first optical fiber is in thermal contact with a respective different one of the links, and wherein the apparatus is arranged to determine the temperature of one or more of the links.

11. The system according to claim 10, wherein one or more of the nodes are active nodes, wherein the management unit is arranged to control one or more of the active nodes in order to control each of the electrical connections of the links connected to one or more of the active nodes.

12. The system according to claim 11, wherein the electrical energy distribution network comprises a plurality of the nodes and a plurality of internode links, the internode links connecting together the nodes to form at least one mesh of a meshed network, the or each mesh being polygonal of an order higher than or equal to three, at least one of the nodes of each mesh being an active node.

13. The system according to claim 11, wherein the management unit is arranged to control the one or more active nodes using optical control signals transmitted via one or more optical fibers of the temperature monitoring apparatus.

14. An aircraft comprising the apparatus according to claim 1.

15. A method of monitoring the temperature of a vehicle's electrical energy distribution network, the method comprising:

producing an optical input signal at an optical interrogator;

providing the optical input signal to a feeder optical fiber configured to provide the optical input signal from the optical interrogator to an optical director component and to provide an optical output signal from the optical director component to the optical interrogator, the optical director component being external to the optical interrogator;

at the optical director component, directing the optical input signal into a plurality of first optical fibers each comprising one or more temperature sensing sections, each of the optical fibers are in thermal contact with a respective portion of the vehicle's electrical energy distribution network, each of the one or more temperature sensing sections arranged to produce, in response to the optical input signal, an optical output signal indicative of a temperature of the respective portion in thermal contact with the optical fiber, wherein the respective portions differ in location on the vehicle's electrical energy distribution network from other respective portions;

receiving at the optical director component the optical output signal from the plurality of first optical fibers;

directing by the director the optical output signal to the feeder optical fiber;

receiving at the interrogator the optical output signal from the feeder optical fiber; and determining a temperature of the vehicle's electrical energy distribution network based on one or more of the optical signals.

16. A vehicle electrical energy distribution network temperature monitoring apparatus, the apparatus comprising:

first optical fibers each comprising one or more temperature sensing sections, each of the first optical fibers are configured for thermal contact with a respective portion of the vehicle electrical energy distribution network, each of the temperature sensing sections being configured such that a change in a temperature of the respective portion causes a change in an optical output signal produced by the temperature sensing section of the first optical fiber in thermal contact with the respective portion in response to an optical input signal, wherein respective portions differ in location on the vehicle's electrical energy distribution network from other respective portions;

an optical interrogator configured to provide the optical input signal to one or more of the temperature sensing sections of each of the first optical fibers; and receive the optical output signal from the one or more temperature sensing sections of each of the first optical fibers;

an optical director component external to the optical interrogator, wherein the optical director component is configured to direct the optical input signal from the optical interrogator to each of the first optical fibers and direct the optical output signal from each of first optical fibers to the optical interrogator;

a feeder optical fiber configured to provide the optical input signal from the optical interrogator to the optical director component and provide the optical output signal from the optical director component to the optical interrogator, and
a component configured to determine a temperature characteristic of the vehicle electrical energy distribution network based on one or more of said optical output signals.

* * * * *